United States Patent
Tomiyama et al.

(10) Patent No.: US 9,759,629 B2
(45) Date of Patent: Sep. 12, 2017

(54) LEAK DETECTION DEVICE, LEAK DETECTION METHOD AND PROGRAM

(71) Applicant: NEC Corporation, Tokyo (JP)

(72) Inventors: Mizuho Tomiyama, Tokyo (JP); Masatake Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/431,803

(22) PCT Filed: Sep. 27, 2013

(86) PCT No.: PCT/JP2013/076224
§ 371 (c)(1),
(2) Date: Mar. 27, 2015

(87) PCT Pub. No.: WO2014/051036
PCT Pub. Date: Apr. 3, 2014

(65) Prior Publication Data
US 2015/0253215 A1 Sep. 10, 2015

(30) Foreign Application Priority Data

Sep. 28, 2012 (JP) .................................. 2012-216948

(51) Int. Cl.
*G01M 3/16* (2006.01)
*G01M 3/24* (2006.01)
*F17D 5/06* (2006.01)

(52) U.S. Cl.
CPC .................. *G01M 3/16* (2013.01); *F17D 5/06* (2013.01); *G01M 3/24* (2013.01); *G01M 3/243* (2013.01)

(58) Field of Classification Search
CPC .......... G01M 3/243; G01M 3/24; G01M 3/16; F17D 5/06
See application file for complete search history.

(56) References Cited

U.S. PATENT DOCUMENTS

| 4,289,019 A | 9/1981 | Claytor | |
|---|---|---|---|
| 6,453,247 B1 * | 9/2002 | Hunaidi | G01M 3/243 702/51 |
| 2012/0007744 A1 * | 1/2012 | Pal | G01M 3/243 340/605 |

FOREIGN PATENT DOCUMENTS

| EP | 2 352 979 B1 | 3/2014 |
|---|---|---|
| JP | 9-4800 | 1/1997 |

(Continued)

OTHER PUBLICATIONS

International Search Report and Written Opinion mailed Dec. 17, 2013 in corresponding PCT International Application.

(Continued)

*Primary Examiner* — Hongmin Fan
(74) *Attorney, Agent, or Firm* — Finnegan, Henderson, Farabow, Garrett & Dunner, L.L.P.

(57) ABSTRACT

A leak detection device is provided which comprises: in order to suppress effects of extraneous vibration and improve accuracy of leak detection, a first detection unit (6) which detects vibration in a first direction and output a first signal S1 representing a magnitude of the vibration in the first direction, the first detection unit (6) being installed to a pipe (2) in which fluid (5) flows; a second detection unit (7) which detects vibration in a second direction different from the first direction and output a second signal S2 representing a magnitude of the vibration in the second direction, the second detection unit (7) being installed to the pipe (2); and a signal processing unit (10) which performs an arithmetic operation processing using the first signal S1 and the second signal S2.

15 Claims, 11 Drawing Sheets

(56) References Cited

FOREIGN PATENT DOCUMENTS

| JP | 11-160186 | 6/1999 |
|----|-----------|--------|
| JP | 2004-125628 | 4/2004 |
| JP | 4460423 | 5/2010 |
| WO | WO 02/01173 A1 | 1/2002 |
| WO | WO 2008/150411 A1 | 12/2008 |

OTHER PUBLICATIONS

Extended European Search Report mailed on Jun. 7, 2016, by the European Patent Office in counterpart European Patent Application No. 13841770.4.

* cited by examiner

Fig.3
(a)
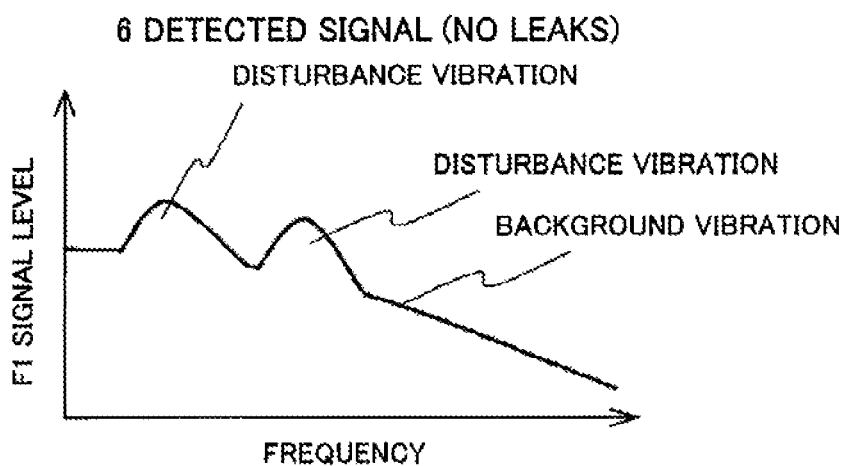
6 DETECTED SIGNAL (NO LEAKS)
(b)
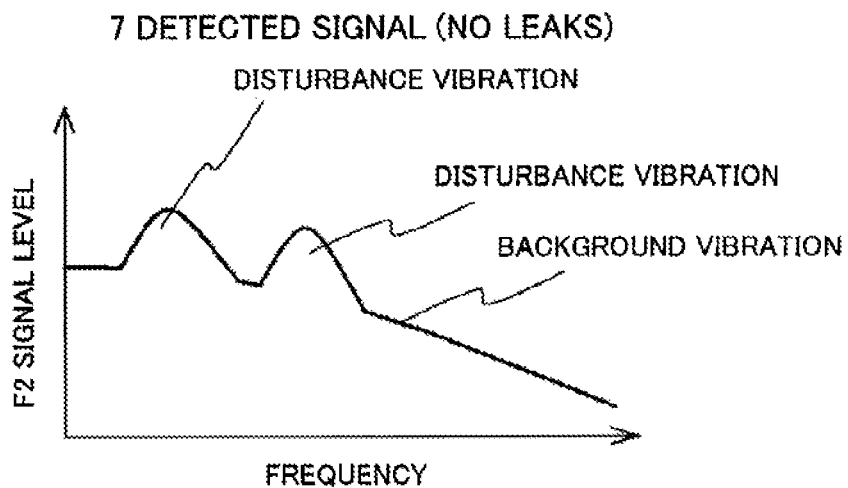
7 DETECTED SIGNAL (NO LEAKS)
(c)
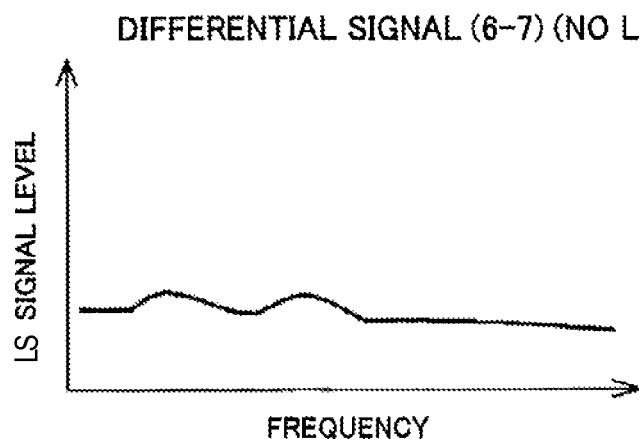
DIFFERENTIAL SIGNAL (6-7) (NO LEAKS)

Fig.4
(a)
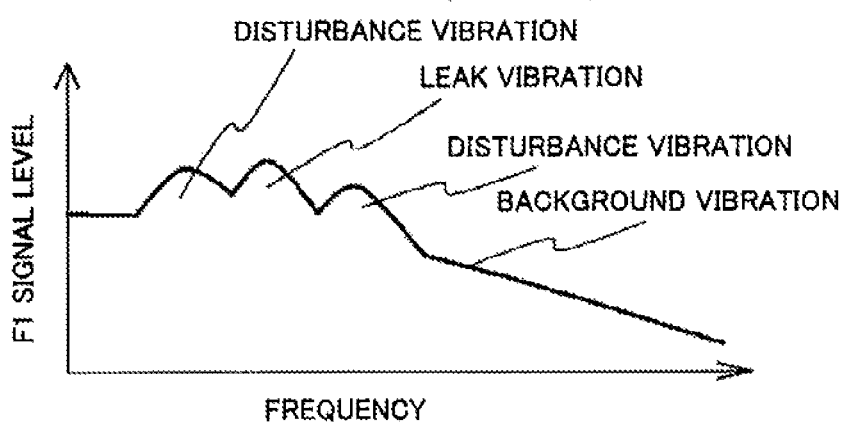
(b)
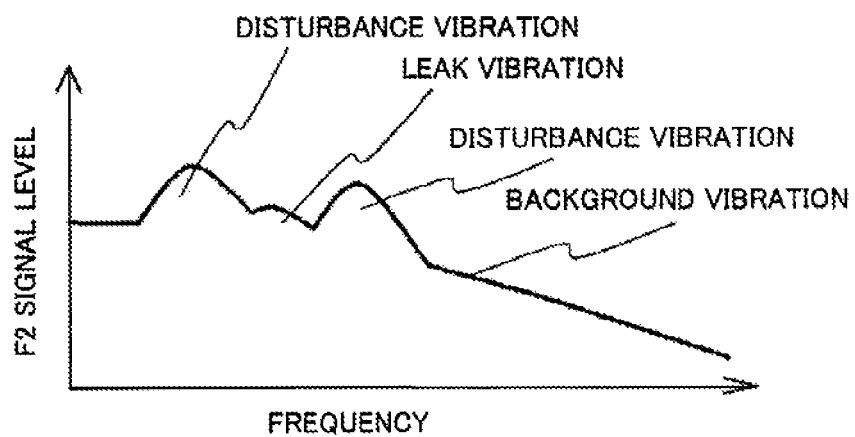
(c)
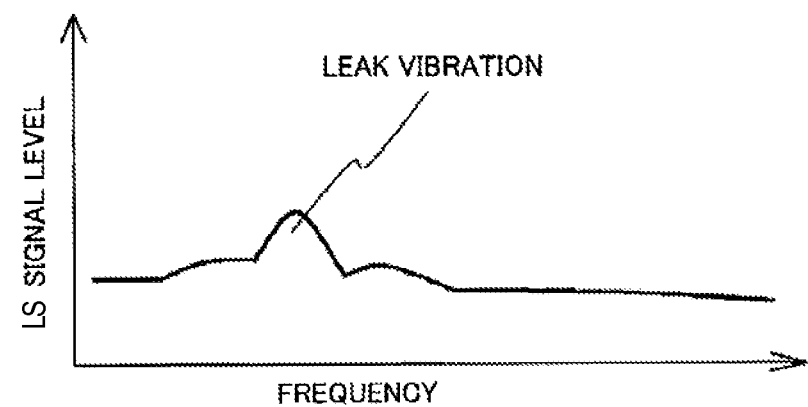

Fig.10
(a)
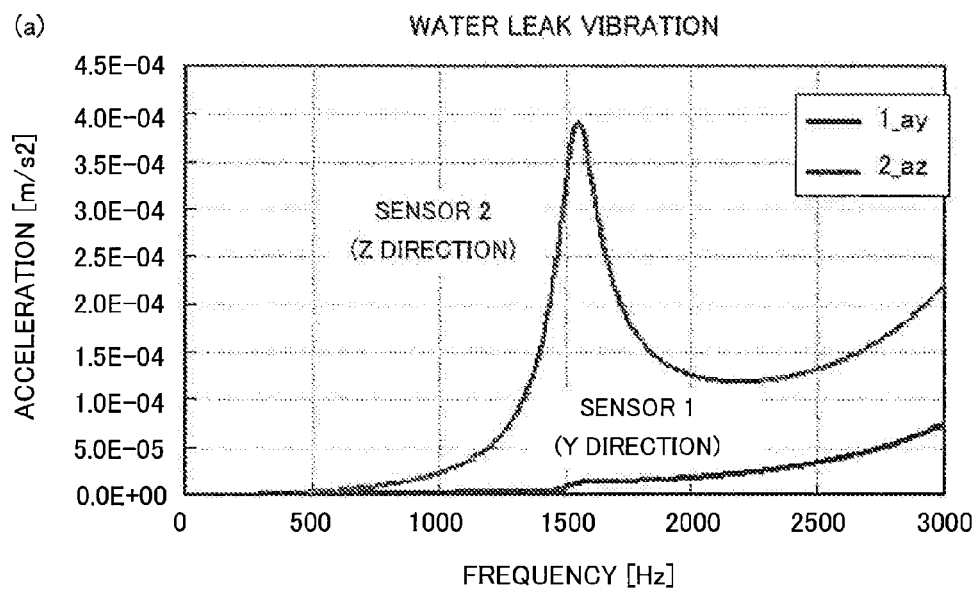
(b)
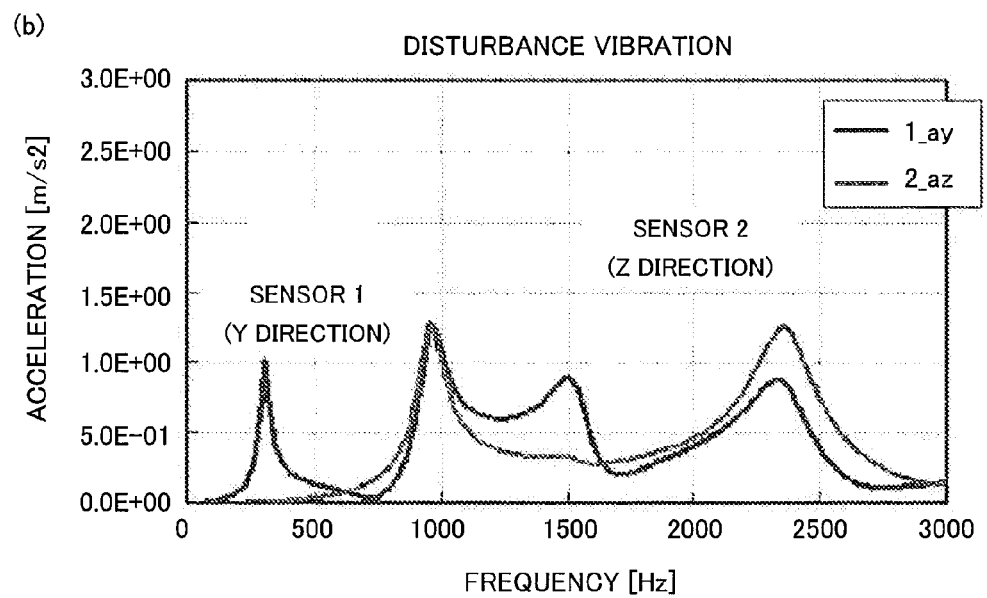

LEAK DETECTION DEVICE, LEAK DETECTION METHOD AND PROGRAM

CROSS-REFERENCE TO RELATED PATENT APPLICATIONS

This application is a National Stage Entry of International Application No. PCT/JP2013/076224, filed Sep. 27, 2013, which claims priority from Japanese Patent Application No. 2012-216948, filed Sep. 28, 2012. The entire contents of the above-referenced applications are expressly incorporated herein by reference.

TECHNICAL FIELD

The present invention relates to a leak detection device, a leak detection method and a program.

BACKGROUND ART

An amount of information stored and used by people and electronic equipment has been steadily increasing with development of information and network technology based on digitization. In order to build a secure and safe community for a human society which has been distracted by a large amount of information, it is important for people to acknowledge useful information by acquiring accurate data of events from a sensor which serves as an input device, and analyzing, determining and processing the data.

In modern life, facilities such as water and sewage networks, high pressure chemical pipelines for gas, oil, and the like, high speed railways, long-span bridges, high-rise buildings, large passenger aircrafts, and automobiles have been built and have become a basis of a rich social infrastructure. If destruction be associated with natural disasters such as unexpected earthquakes and deterioration of lifetimes lead to a serious accident, impacts on society will be enormous, and economic losses will be large. Deterioration such as corrosion, wear and rattling of members used in the facilities will worsen as a time of use elapses, which will eventually lead to malfunction such as destruction. In order to ensure reassurance and safety of the facilities, great efforts have been made in technology developments beyond academic areas such as science, engineering, and sociology. Among these, development of a non-destructive inspection technique which is a low cost and simple-to-operate inspection technique has become increasingly important in achieving prevention of serious accidents due to deterioration or destruction of the facilities.

Various methods for non-destructive inspection techniques for water leak in water and sewage networks, gas leak in gas pipes, and leak in various pipes in chemical plants have been proposed and have been put to practical use. An inspection method using a vibration sensor has been known as a typical conventional non-destructive inspection method. In this inspection method, a vibration sensor is arranged on a pipe, a place in contact with a pipe, for example, a ground surface adjacent to where the pipe is buried, and the like and vibration caused by a leak of the pipe is detected.

Furthermore, PTL 1 discloses a technology in which leak detection accuracy is improved by removing extraneous vibration superimposed on vibration caused by a leak. The extraneous vibration includes passing sounds of transportation means such as automobiles and trains, natural sounds of the atmosphere such as wind, and extraneous noises such as human voices. In PTL 1, two detectors consisting of a vibration detector for detecting leak vibration and extraneous vibration and a vibration detector for detecting only extraneous vibration are provided, and leak detection accuracy is improved by means of generating only vibration due to a leak by removing extraneous vibration by obtaining a difference of signals from the two detectors.

CITATION LIST

Patent Literature

[PTL 1] Japanese Patent Publication No. 4460423

SUMMARY OF INVENTION

Technical Problem

In the invention disclosed in PTL 1, the two detectors are placed in different positions and a vibration propagation path from a vibration source of extraneous vibration to a detection unit is different among the two detectors. Since a frequency band in which vibration easily propagates varies depending on the propagation path, extraneous vibration detected from signals obtained by the two detectors is different in the two signals. Therefore, there has been a problem that extraneous vibration superimposed on vibration caused by a leak is hard to be removed even obtaining a difference of the two signals.

An object of the present invention is to provide a technology which suppresses effects of extraneous vibration and improves leak inspection accuracy.

Solution to Problem

According to the present invention, a leak detection device is provided which includes: a first detection unit, being installed to a pipe in which fluid flows, for detecting vibration in a first direction to output a first signal $S1$ representing a magnitude of the vibration in the first direction; a second detection unit, being installed to the pipe, for detecting vibration in a second direction different from the first direction and outputting a second signal $S2$ representing a magnitude of the vibration in the second direction; and a signal processing unit for performing an arithmetic operation processing using the first signal $S1$ and the second signal $S2$.

Furthermore, according to the present invention, a leak detection method is provided in which a computer executes: a first detection step of detecting vibration in a first direction by controlling a sensor installed to a pipe in which fluid flows and outputting a first signal $S1$ representing a magnitude of the vibration in the first direction; a second detection step of detecting vibration in a second direction different from the first direction by controlling a sensor installed to the pipe and outputting a second signal $S2$ representing a magnitude of the vibration in the second direction; and a signal processing step of performing an arithmetic operation processing using the first signal $S1$ and the second signal $S2$.

In addition, according to the present invention, a program is provided which causes a computer to function as: a first detection means for detecting vibration in a first direction by controlling a sensor installed to a pipe in which fluid flows and outputting a first signal $S1$ representing a magnitude of the vibration in the first direction; a second detection means for detecting vibration in a second direction which is different from the first direction by controlling a sensor installed to the pipe and outputting a second signal $S2$ representing a magnitude of the vibration in the second direction; and a signal processing means of performing an arithmetic operation processing using the first signal S1 and the second signal S2.

Advantageous Effects of Invention

According to the present invention, it is possible to suppress effects of extraneous vibration and improve accuracy of leak inspection.

BRIEF DESCRIPTION OF DRAWINGS

The object described above and other objects, features, and advantages will be more apparent from preferred embodiments to be described below and the following drawings associated therewith.

FIG. 3 is a diagram of explaining operational effects of the present exemplary embodiment.

FIG. 4 is a diagram of explaining operational effects of the present exemplary embodiment.

FIG. 10 is diagrams of explaining the Example.

DESCRIPTION OF EMBODIMENTS

In the following, the exemplary embodiments of the present invention will be explained using the drawings.

Note that devices of the present exemplary embodiments are realized by any combination of hardware and software, including a CPU, a memory, programs loaded into the memory (including programs that a memory is stored in a device before shipping and programs downloaded from storage media such as CDs, a server on the Internet, and the like), a storage unit such as hard discs for storing the programs, and an interface for connecting a network, of any computer. It is understood to those skilled in the art that there are various modifications to its implementation methods and devices.

In addition, functional block diagrams used in explaining the present exemplary embodiments illustrate blocks in functional units rather than configuration of hardware units. In these diagrams, although each device is described so as to be implemented by a single hardware, an implementation means is not limited to this. In other words, it may be a physically-divided configuration or a logically-divided configuration.

First Exemplary Embodiment

Figure 1:
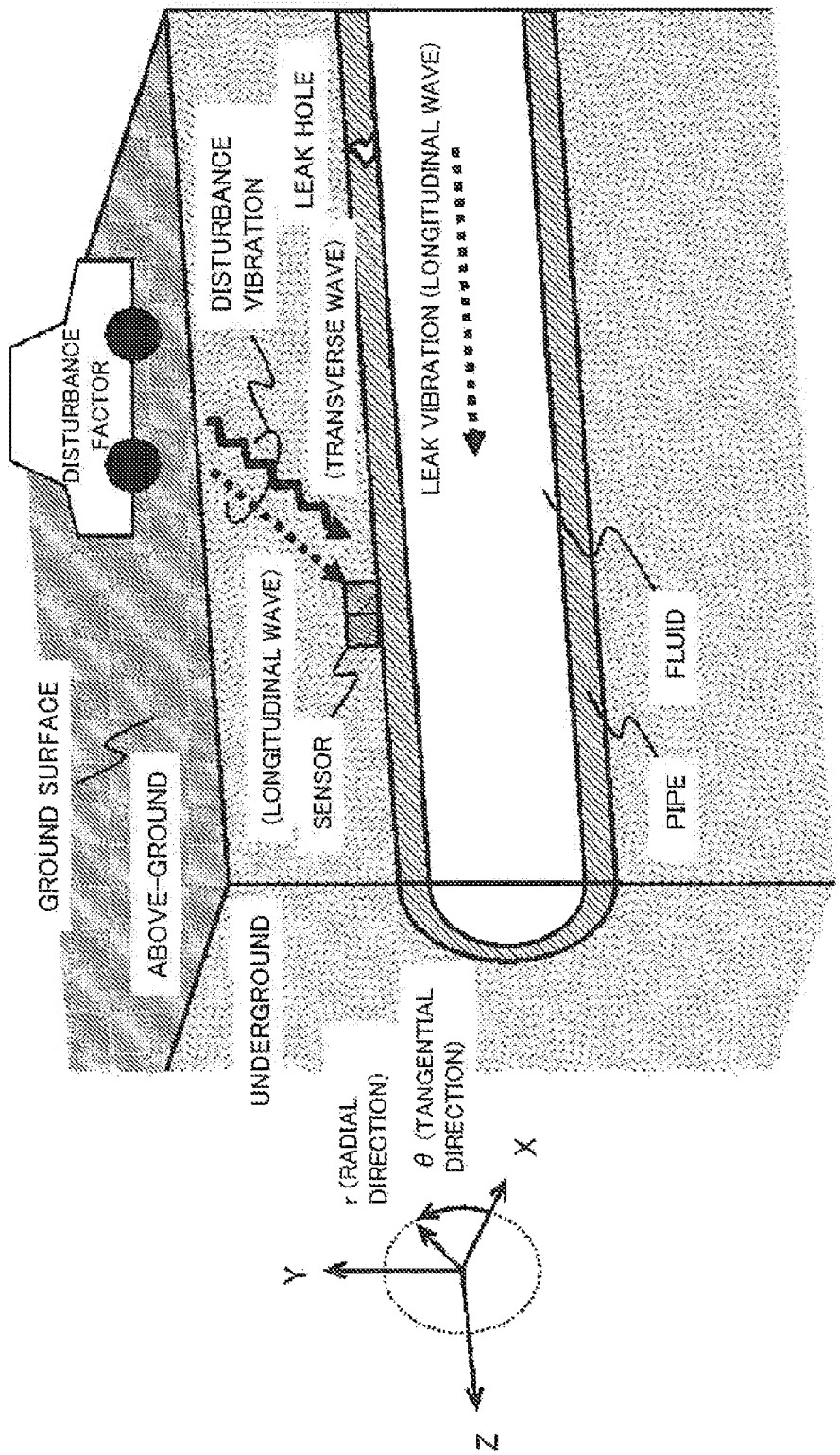
FIG. 1 is a diagram of explaining a concept of the present embodiment.

First, a concept of the present exemplary embodiments will be described by using FIG. 1.

When a leak hole is formed in a pipe, vibration having frequencies corresponding to a state (e.g. shapes and sizes) of the leak hole is generated from the leak hole and propagates through the pipe and/or fluid flowing in the pipe. It is possible to detect, by installing a sensor to the pipe and detecting vibration (hereinafter, "leak vibration") caused by the leak hole, that a leak hole is formed in a pipe. For example, it can be determined that a leak hole is not formed in a pipe, by checking whether or not a component (a peak at a specific frequency) which may not be detected when no leak holes are formed appears in a signal detected by the sensor. In addition, a position of a leak hole can be specified by installing a plurality of sensors to a pipe and detecting leak vibration with the plurality of sensors using a method such as a correlation method.

However, a sensor installed to a pipe may detect not only leak vibration but also vibration (hereinafter, "disturbance vibration") caused by extraneous noises, states of which change irregularly, such as passing sounds of transportation means such as automobiles and trains, natural sounds of the atmosphere such as winds, and human voices. In other words, not only a leak vibration component but also a disturbance vibration component may be included in a signal detected by a sensor. When detection of a presence or absence or determination of a position of a leak hole is performed using such vibration data as it is, accuracy will deteriorate due to incorrectly regarding a disturbance vibration component as a leak vibration component. A leak detection device of the present exemplary embodiments includes a means for removing a disturbance vibration component from a signal detected by a sensor.

The inventors have brought to completion a means for removing a disturbance vibration component from a signal detected by a sensor by focusing on the following points.

Leak vibration propagates from a leak hole into the underground and fluid in a pipe. Of the leak vibration, leak vibration propagating into the underground is greatly attenuated in the underground. On the other hand, vibration propagating into fluid in a pipe propagates in a drawing direction of the pipe as a longitudinal wave. Therefore, when a sensor capable of detecting vibration in illustrated X, Y and Z directions installed to a pipe as illustrated in FIG. 1 detects leak vibration, a vibration component in the Z direction will be mainly detected.

On the other hand, a number of disturbance vibration factor (hereinafter, disturbance factors) is not one but plural, and disturbance vibration may include a longitudinal wave and a transverse wave. When a sensor is installed to a pipe installed in the underground as illustrated in FIG. 1, the sensor is to mainly detect disturbance vibration which comes through the underground from the above-ground side since disturbance factors mainly exist in the above-ground side. In other words, disturbance vibration which is detected by a sensor installed to a pipe located in the underground often includes vibration components of all of the illustrated X, Y and Z directions.

In view of the above, in the present exemplary embodiments, a sensor (a first sensor) is installed to a pipe such that it can detect vibration in a longitudinal direction (the Z direction as illustrated) of the pipe. Leak vibration is detected by the first sensor. Note that the first sensor results in detecting a Z-direction component of disturbance vibration. In other words, a signal detected by the first sensor includes not only a leak vibration component but also a disturbance vibration component.

Accordingly, in the present exemplary embodiments, vibration in a perpendicular direction (for example, the X direction or Y direction as illustrated) and a longitudinal direction of the pipe is detected by a second sensor installed to the pipe. When the first sensor detects a Z-direction component of disturbance vibration, the second sensor simultaneously detects disturbance vibration components in other directions included in the disturbance vibration.

In the present exemplary embodiments, a signal, not only in which a leak vibration component is included but also from which a disturbance vibration component is removed, is obtained by subtracting a vibration component detected by the second sensor from a vibration component detected by the first sensor.

In the following, configurations of the leak detection device of the present exemplary embodiments are described in detail.

Figure 11:
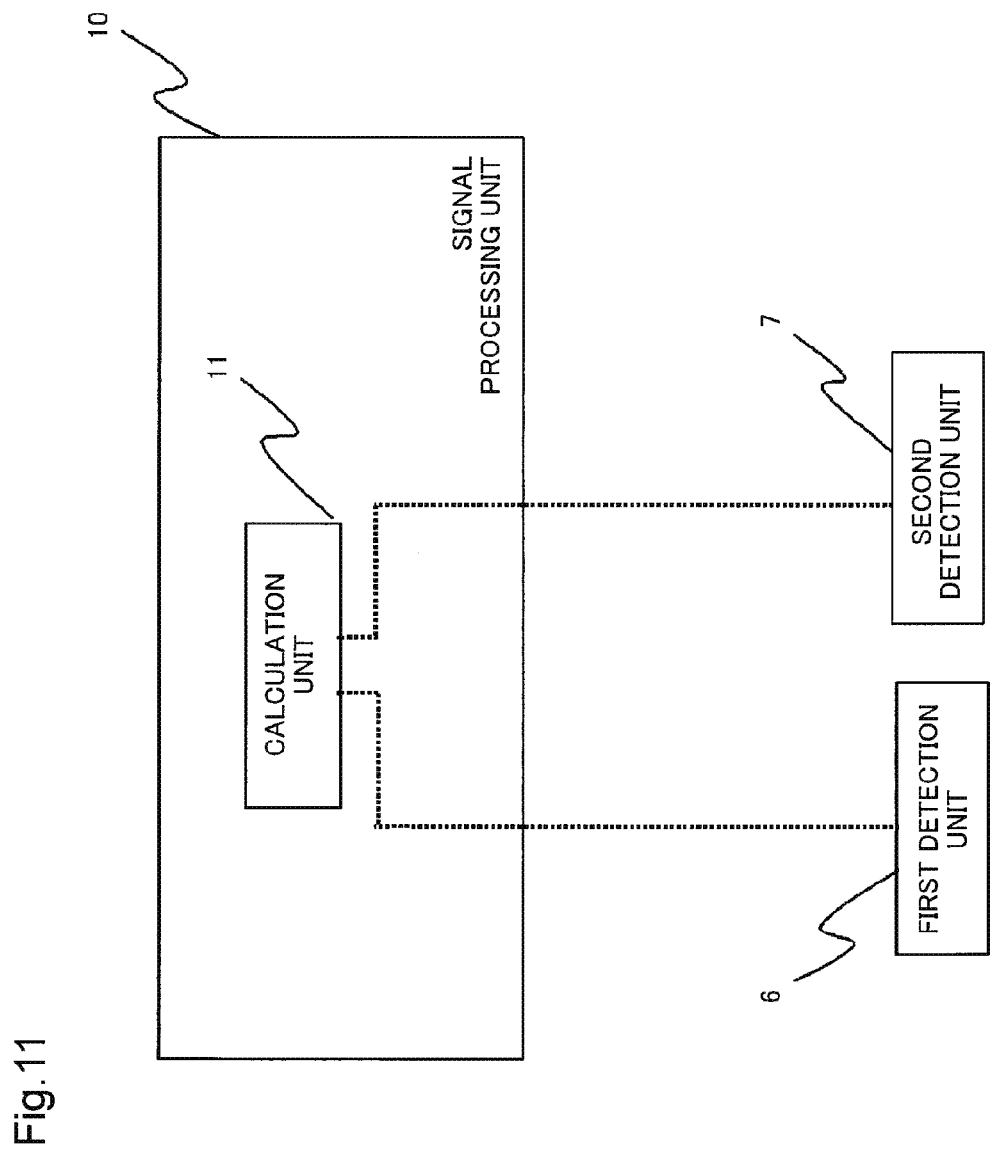
FIG. 11 is an example of a functional block unit of the leak detection device of the present exemplary embodiment.

FIG. 11 illustrates an example of a functional block diagram of the leak detection device of the present exemplary embodiments. As illustrated, the leak detection device of the present exemplary embodiments includes a first detection unit 6, a second detection unit 7, and a signal processing unit 10 which includes a calculation unit 11.

Figure 2:
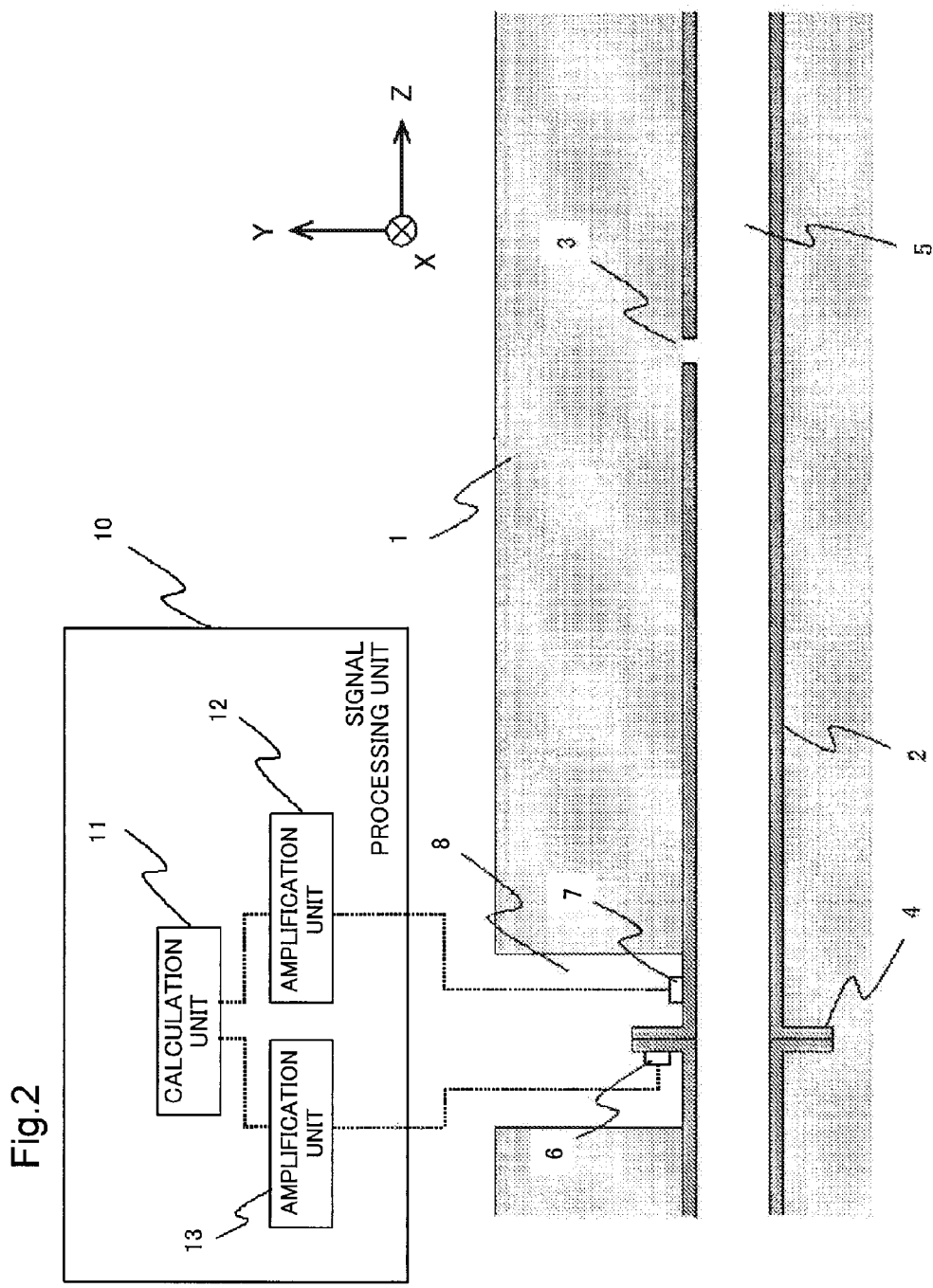
FIG. 2 is one of application examples of a leak detection device of the present exemplary embodiment.

FIG. 2 illustrates an application example of a leak detection device according to a first exemplary embodiment. The leak detection device includes a first detection unit 6, a second detection unit 7 and a signal processing unit 10. The signal processing unit 10 includes a calculation unit 11, an amplification unit 12, and an amplification unit 13. The first detection unit 6 and the signal processing unit 10 as well as the second detection unit 7 and the signal processing unit 10 are configured to be cable of performing a wired and/or wireless communication.

Figure 5:
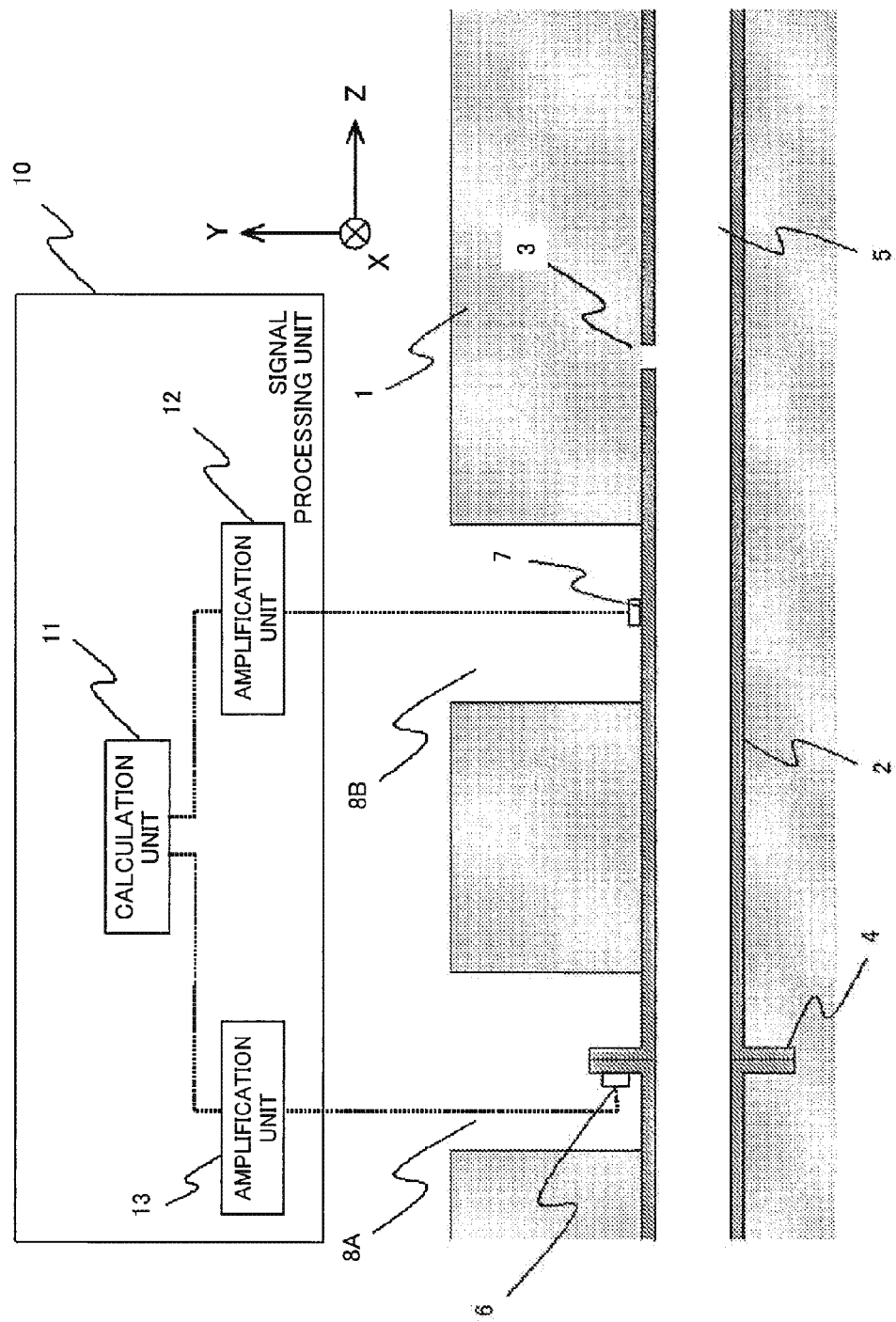
FIG. 5 is one of application examples of the leak detection device of the present exemplary embodiment.

The first detection unit 6 and the second detection unit 7 are installed to a pipe 2. The pipe 2 is buried in the underground 1 and fluid 5 (e.g. water) flows therein. In an example illustrated in FIG. 2, the first detection unit 6 and the second detection unit 7 are installed to the pipe 2 in the same manhole 8. Note that, as illustrated in FIG. 5, the first detection unit 6 and the second detection unit 7 may be installed to the pipe 2 in different manholes. In an example illustrated in FIG. 5, the first detection unit 6 is installed to the pipe 2 in a first manhole 8A, and the second detection unit 7 is installed to the pipe 2 in a second manhole 8B.

The leak detection device is configured to perform at least one of a process to determine whether or not a leak hole 3 is formed in the pipe 2 and a process to specify a position of the leak hole 3.

The first detection unit 6 is installed to the pipe 2 to detect first direction vibration propagating through the pipe 2. In other words, the first detection unit 6 is installed to the pipe 2 such that a detectable vibration direction is parallel to the first direction. Note that it may not necessarily be exactly parallel but may be slightly deviated therefrom. The first detection unit 6 outputs a first signal S1 representing a magnitude (e.g. acceleration, amplitude, displacement, velocity, etc.) of vibration in the first direction. The first signal S1 is a signal representing a time response of a signal level corresponding to the magnitude of the vibration detected by the first detection unit 6.

Note that vibration propagating through the fluid 5 propagates to the pipe 2. In other words, the first detection unit 6 can detect vibration propagating through the fluid 5 via the pipe 2. Furthermore, the first detection unit 6 detects disturbance vibration coming through the underground 1 via the pipe 2, air in the manhole 8, and the like.

The first direction is a direction in which leak vibration caused by the leak hole 3 formed in the pipe 2 mainly propagates, for example, the longitudinal direction of the pipe 2.

The first detection unit 6 may include a sensor capable of detecting vibration in a predetermined direction, for example, a sensor of measuring vibration of a solid. Sensors corresponding to this include a piezoelectric type acceleration sensor, an electrodynamic acceleration sensor, a capacitance type acceleration sensor, an optical speed sensor, a dynamic strain sensor, and the like.

Figure 6:
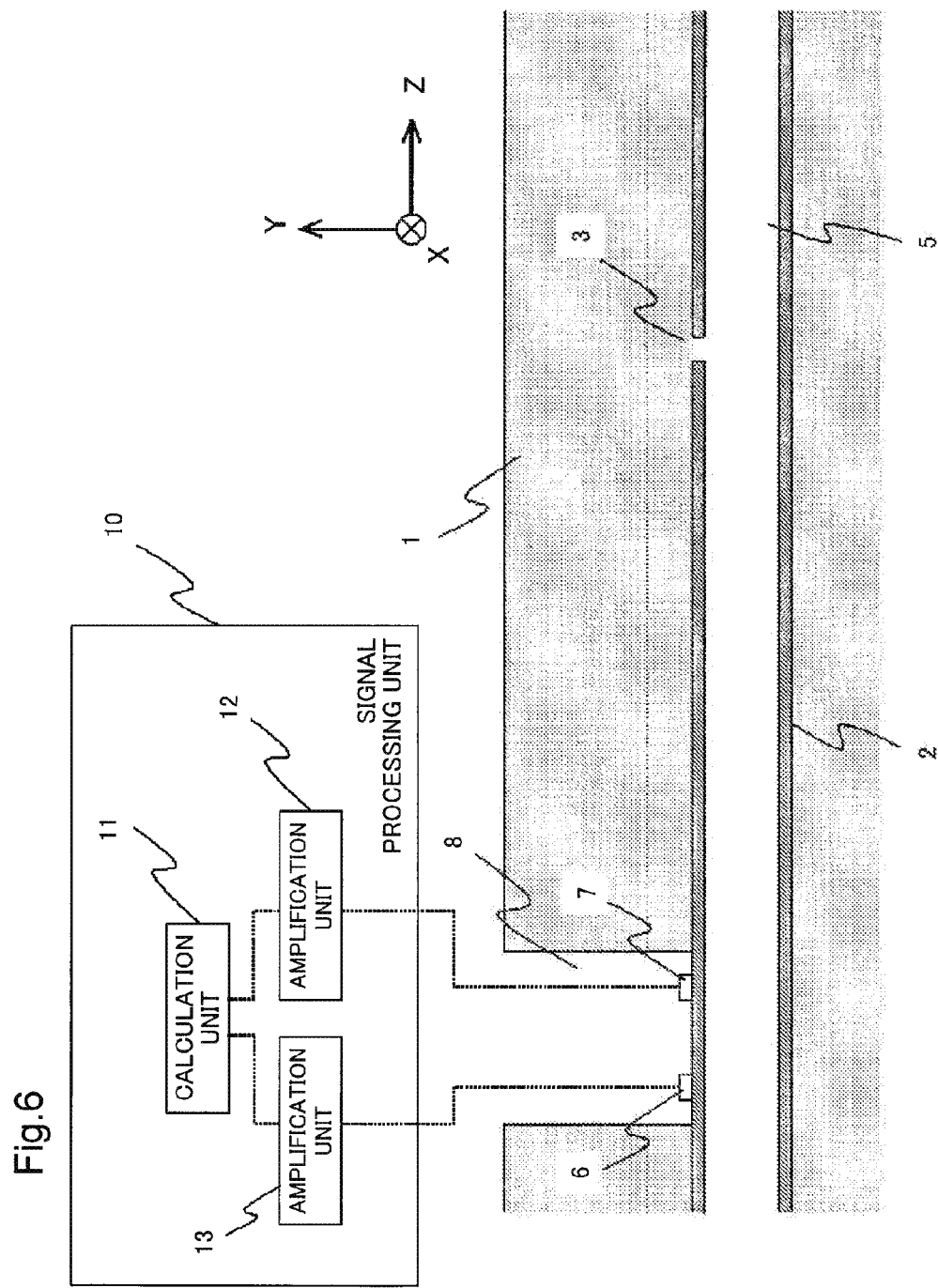
FIG. 6 is one of application examples of the leak detection device of the present exemplary embodiment.

An installation position of the first detection unit 6 is not particularly limited, and it may be, for example, installed to a flange 4 as illustrated in FIG. 2. It may also be installed directly to an outer wall surface of the pipe 2 as illustrated in FIG. 6. In addition, although not illustrated, it may also be installed to a joint portion connecting two or more pipes 2, a fire hydrant installed to the pipe 2, a water stop valve and a gate valve installed in the pipe 2, or the like. Furthermore, with other predetermined mechanism for propagating vibration having attached to the pipe 2, the first detection unit 6 may be installed to the mechanism. As a method of installing the first detection unit 6 at these positions, for example, use of a magnet, use of a dedicated jig, and use of an adhesive are conceivable.

Note that, although not illustrated, the first detection unit 6 may also be installed inside the pipe 2. In other words, "the first detection unit 6 is installed to the pipe 2" includes not only aspects illustrated above but also aspects of installing the first detection unit 6 inside the pipe 2. In such cases, the first detection unit 6 can directly detect vibration in the first direction propagating through the fluid 5.

The second detection unit 7 is installed to the pipe 2 to detect vibration in a second direction, which is different from the first direction, propagating through the pipe 2. In other words, the second detection unit 7 is installed to the pipe 2 such that a detectable vibration direction is parallel to the second direction. Note that the second detection unit 7 may not necessarily be exactly parallel so that may be allowed to be slightly deviated therefrom. The second detection unit 7 outputs a second signal S2 representing a magnitude (e.g. a vibration acceleration, a vibration amplitude) of vibration in the second direction. The second signal S2 is a signal representing a time response of a signal level corresponding to the magnitude of the vibration detected by the second detection unit 7.

The second detection unit 7 can detect disturbance vibration propagating the underground 1 via the pipe 2, air in the manhole 8, and the like.

The second direction may be a direction perpendicular to the first direction. For example, the second direction may be a radial direction of the pipe 2, in particular, a direction (the Y direction as illustrated) connecting the pipe 2 and the above-ground among the radial directions in the shortest path. Alternatively, the second direction may be a tangential direction of the pipe 2, in particular, a direction (the X direction as illustrated) tilted by 90° from the direction connecting the pipe 2 and the above-ground among the radial directions in the shortest path.

The second sensor unit 7 may include a sensor capable of detecting vibration in a predetermined direction, for example, a sensor for measuring vibration of solids. Sensors corresponding to this include a piezoelectric type acceleration sensor, an electrodynamic acceleration sensor, a capacitance type acceleration sensor, an optical speed sensor, a dynamic strain sensor, and the like.

An installation position of the second detection unit 7 is not particularly limited, and for example it may be installed directly on an outer wall surface of the pipe 2 as illustrated in FIGS. 2 and 5. In addition, although not illustrated, the second detection unit 7 may also be installed to the flange 4, a joint portion connecting two or more pipes 2, a fire hydrant installed to the pipe 2, a water stop valve and a gate valve installed in the pipe 2, or the like. Furthermore, with other predetermined mechanism for propagating vibration having attached to the pipe 2, the second detection unit 7 may be installed to the mechanism. As a method of installing the second detection unit 7 at these positions, for example, use of a magnet, use of a dedicated jig, and use of an adhesive are conceivable.

Note that, although not illustrated, the second detection unit 7 may also be installed inside the pipe 2. In other words, "the second detection unit 7 is installed to the pipe 2" includes not only aspects exemplified above but also aspects of installing the second detection unit 7 inside the pipe 2.

Figure 7:
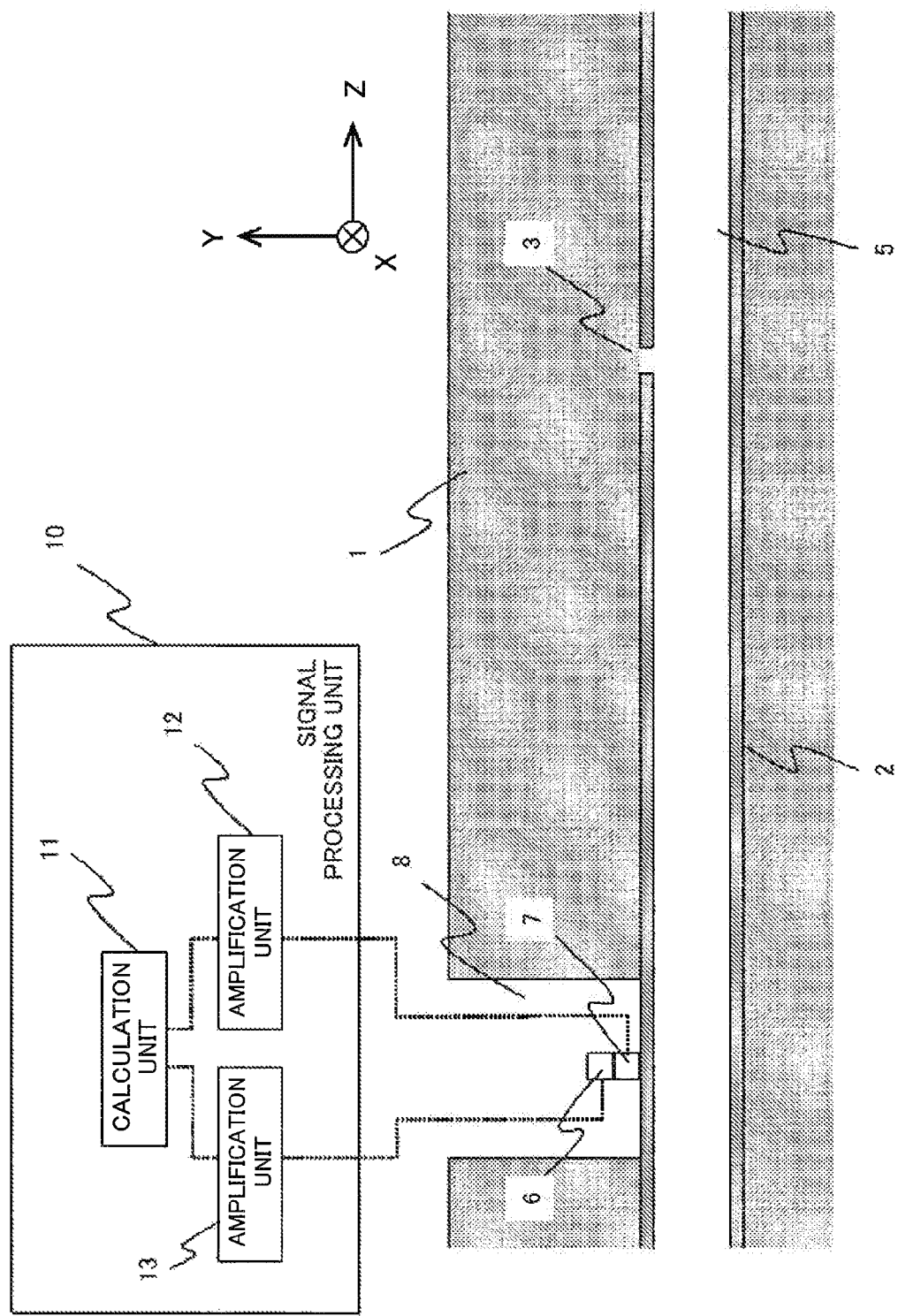
FIG. 7 is one of application examples of the leak detection device of the present exemplary embodiment.

As an another example, the first detection unit 6 and the second detection unit 7 may be constituted of sensors which can separately detect vibration in at least two axial directions (an angle formed between the two axes being 90°) as illustrated in FIG. 7. In such cases, the first detection unit 6 and the second detection unit 7 are provided in the same housing.

The signal processing unit 10 will be described in the following.

Having received the first signal S1 from the first detection unit 6, the amplification unit 13 amplifies the first signal S1 to input to the calculation unit 11. Note that the amplification unit 13 may be included in the first detection unit 6.

Having received the second signal S2 from the second detection unit 7, the amplification unit 12 amplifies the second signal S2 to input to the calculation unit 11. Note that the amplification unit 12 may be included in the second detection unit 7.

The calculation unit performs an arithmetic operation processing using the first signal S1 and the second signal S2.

For example, the calculation unit 11 calculates a third signal F1 representing for each frequency of a magnitude of vibration in the first direction using the first signal S1 which is a signal representing a time response of a signal level corresponding to a magnitude of vibration detected by the first detection unit 6. Furthermore, the calculation unit 11 calculates a fourth signal F2 representing for each frequency of a magnitude of vibration in the second direction using the second signal S2 which is a signal representing a time response of a signal level corresponding to a magnitude of vibration detected by the second detection unit 7.

Using the third signal F1 and the fourth signal F2, the calculation unit 11 generates, according to LS=F1−F2, a signal LS representing in each frequency which is a difference obtained by subtracting each frequency of the magnitude of the vibration of the second direction in the fourth signal F2 from the magnitude of the vibration of the first direction in the third signal F1. The calculation unit 11 performs, using the signal LS, at least one of processing, a process of determining a presence or absence of a leak of fluid 5 from the pipe 2 and a process of specifying a leak position (leak hole 3).

FIG. 3(a) illustrates the third signal F1 obtained in a state in which the leak hole 3 is not formed in the pipe 2. Furthermore, FIG. 3(b) illustrates the fourth signal F2 obtained in the state in which the leak hole 3 is not formed in the pipe 2. In addition, FIG. 3(c) illustrates the signal LS obtained by subtracting the fourth signal F2 of FIG. 3(b) from the third signal F1 of FIG. 3(a). The horizontal axis represents a frequency and the vertical axis represents a signal level.

A disturbance vibration component is superimposed on a background vibration component in any of the third signal F1 and the fourth signal F2. In any of the third signal F1 and the fourth signal F2, there appear two peaks caused by disturbance vibration, and their frequency positions coincide. In other words, it is illustrated that disturbance vibration including vibration components of the Y direction and the Z direction illustrated in FIG. 2 was detected by both of the first detection unit 6 and the second detection unit 7.

By subtracting the fourth signal F2 (FIG. 3(b)) from the third signal F1 (FIG. 3(a)), as illustrated in FIG. 3(c), the signal LS is obtained removing the background vibration component and the disturbance vibration component.

Next, FIG. 4(a) illustrates the third signal F1 obtained in a state in which the leak hole 3 is formed in the pipe 2. In addition, FIG. 4(b) illustrates the fourth signal F2 obtained in the state in which the leak hole 3 is formed in the pipe 2. Furthermore, FIG. 4(c) illustrates the signal LS obtained by subtracting the fourth signal F2 of FIG. 4(b) from the third signal F1 of FIG. 4(a). The horizontal axis represents a frequency and the vertical axis represents a signal level.

A background vibration component, a disturbance vibration component, and a leak vibration component are overlapped in the third signal F1. In the fourth signal F2, a disturbance vibration component is superimposed on a background vibration component and a small amount of a leak vibration component is superimposed thereon. Although leak vibration propagating along the pipe 2 is also detected by the second detection unit 7, its sensitivity to a longitudinal wave caused by leak vibration which propagates in the Z direction is sufficiently smaller than that of the first detection unit 6 since the second detection unit 7 detects vibration in the radial direction of the pipe 2. Therefore, a peak of leak vibration included in the fourth signal F2 is small compared to a peak of leak vibration included in the third signal F1. Note that the disturbance vibration component and the leak vibration component appear at the same frequency positions similar to the case of FIG. 3.

Therefore, as illustrated in FIG. 4(c), subtracting the fourth signal F2 of FIG. 4(b) from the third signal F1 of FIG. 4(a), the signal LS is obtained from which the background vibration component and the disturbance vibration component have been removed and in which the leak vibration component remains.

Other processing performed by the calculation unit 11 will be described. For example, using the first signal S1, the calculation unit 11 calculates the third signal F1 representing a magnitude of vibration in the first direction for each frequency. Then, using the third signal F1 and a first amplification factor K1 which is a predetermined constant, the calculation unit 11 calculates K1×F1 which is a signal obtained by correcting the magnitude of the vibration in the first direction in the third signal F1.

Furthermore, the calculation unit 11 calculates the fourth signal F2 representing a magnitude of vibration in the second direction for each frequency using the second signal S2. Then, using the fourth signal F2 and a second amplification factor K2 which is a predetermined constant, the calculation unit 11 calculates K2×F2 which is a signal obtained by correcting the magnitude of the vibration in the second direction in the fourth signal F2.

Then, using K1×F1 and K2×F2, the calculation unit 11 generates, according to LS=K1×F1−K2×F2, a signal LS which represents for each frequency of differences obtained by subtracting each frequency of a magnitude of vibration of K2×F2 from a magnitude of vibration of K1×F1. The calculation unit 11, using the signal LS, performs at least one of processing, a process of determining a presence or absence of a leak of fluid 5 from the pipe 2 and a process of identifying a leak position (the leak hole 3).

It is preferable that the first amplification factor K1 and the second amplification factor K2 are determined such that a magnitude of a peak of disturbance vibration included in the third signal F1 is equal to a magnitude of a peak of disturbance vibration included in the fourth signal F2, the signals F1 and F2 being obtained in a state in which the leak hole 3 is not formed in the pipe 2. Thereby, the peak of disturbance vibration included in the signal LS can be reduced and the process described above may be performed emphasizing the signal level of the leak vibration.

In addition, as illustrated in FIG. 2 and FIG. 5, when the first detection unit 6 and the second detection unit 7 are respectively installed to two pipes which are the pipes 2 physically separated and which are connected by the flange 4 or the like, the first detection unit 6 and the second detection unit 7 detect a signal in which peaks appear at the same frequencies, however, a phenomenon that one peak is smaller than the other peak and the like may appear since a portion of vibration is attenuated by the flange 4 and the like. In such a case, setting appropriate values to K1 and K2 and adjusting each of the peak levels appropriately, a signal from which a disturbance vibration component is removed and in which a leak vibration component remains may be obtained.

In addition, when a plurality of peaks of disturbance vibration are included in the third signal F1 and the fourth signal F2 and a magnitude relationship among the plurality of peaks of disturbance vibration are different in F1 and F2, all of the magnitudes of the peaks of the disturbance vibration included in the signal LS is hard to be reduced. In this case, it is preferable to determine the first amplification factor K1 and the second amplification factor K2 such that the maximum value of the plurality of the peaks of the disturbance vibration of the third signal F1 is most reduced. Thereby, even when a peak of the leak vibration included in F1 is superimposed on a peak of the disturbance vibration, effects of the disturbance vibration can be minimized.

K1 and K2 may be stored in the signal processing unit 10 in advance or may be determined and input to the signal processing unit 10 by an operator based on F1 and F2.

An example of other processing by the calculation unit 11 will be described. For example, the calculation unit 11 calculates the third signal F1 representing each frequency of the magnitude of the vibration in the first direction using the first signal S1. Then, the calculation unit 11 calculates C1×F1 which is a signal obtained by correcting for each frequency of the magnitude of the vibration of the first direction in the third signal F1, using the third signal F1 and a first amplification factor C1 which is a variable determined by each frequency.

In addition, the calculation unit 11 calculates the fourth signal F2 representing each frequency of the magnitude of the vibration in the second direction using the second signal S2. Then, the calculation unit 11 calculates C2×F2 which is a signal obtained by correcting each frequency of the magnitude of the vibration in the second direction in the fourth signal F2, using the fourth signal F2 and a second amplification factor C2 which is a variable determined by each frequency.

Then, using C1×F1 and C2×F2, the calculation unit 11 generates, according to LS=C1×F1−C2×F2, a signal LS representing each frequency of a difference obtained by subtracting for each frequency of a magnitude of vibration of C2×F2 from a magnitude of vibration of C1×F1. The calculation unit 11 performs, using the signal LS, at least one of processing, a process of determining a presence or absence of a leak of the fluid 5 from the pipe 2 and a process of identifying a leak position (the leak hole 3).

The first amplification factor C1 and the second amplification factor C2 may be determined so as to reduce a magnitude of a peak of disturbance vibration included in the signal LS, by making a magnitude of a peak of disturbance vibration included in the third signal F1 to be equal to a magnitude of a peak of disturbance vibration included in the fourth signal F2, the third signal F1 being obtained in a state in which the leak hole 3 is not formed in the pipe 2.

According to this example, by setting C1 and C2 to appropriate values corresponding to the frequencies, a process as described above may be performed reducing a signal level of the disturbance vibration and emphasizing a signal level of the leak vibration. As a result, a signal in which a signal level of leak vibration is emphasized and in which a signal level of disturbance vibration is sufficiently reduced is obtained.

In addition, as illustrated in FIGS. 2 and 5, when the first detection unit 6 and the second detection unit 7 are respectively installed to two pipes which are the pipes 2 physically separated and which are connected by the flange 4 or the like, the first detection unit 6 and the second detection unit 7 detect a signal in which peaks appear at the same frequencies but a portion of vibration is attenuated by the flange 4 and the like. Consequently, a phenomenon that one peak is smaller than the other peak and the like may appear. In such a case, by setting appropriate values to C1 and C2 adjusting each of the peak levels appropriately, a signal from which a disturbance vibration component is removed and in which a leak vibration component remains may be obtained.

C1 and C2 may be stored in the signal processing unit 10 in advance or may be determined and be input to the signal processing unit 10 by an operator based on F1 and F2.

The calculation unit 11 may perform processing of determining a presence or absence of a leak of the fluid 5 from the pipe 2 and a process of specifying a leak position (the leak hole 3) using the signal LS and all conventional technologies (a comparison with a threshold value, a correlation method, etc.). Explanation of the processing is omitted here.

A leak detection method by means of the leak detection device will be described with reference to FIG. 2.

The first detection unit 6 detects vibration of the longitudinal direction (Z direction) of the pipe 2. The first signal S1 corresponding to a magnitude of the detected vibration is input to the amplification unit 13. The second detection unit 7 detects vibration in a direction (the Y direction) connecting the pipe 2 and the above-ground (immediately above). The second signal S2 corresponding to a magnitude of the detected vibration is input to the amplification unit 12.

When the leak hole 3 is formed in the pipe 2, the leak hole 3 becomes a vibration source of leak vibration. Among vibration generated from the leak hole 3, vibration propagating through the underground 1 diffuses into the underground and will be attenuated. On the other hand, vibration propagating through the pipe 2 and the fluid 5 flowing inside the pipe 2 propagates along the pipe 2 as a longitudinal wave. Leak vibration propagating along the pipe 2 is detected as vibration in the Z direction by the first detection unit 6 via the pipe 2 and the flange 4.

Although leak vibration propagating along the pipe 2 is detected by the second detection unit 7, its sensitivity to a longitudinal wave caused by leak vibration which vibrates to the Z direction is sufficiently smaller than that of the first detection unit 6 since the second detection unit 7 detects vibration in the radial direction of the pipe 2. In other words, a leak vibration component included in the second signal S2 being output to the amplification unit 12 from the second detection unit 7 is sufficiently smaller than a leak vibration component included in a first signal S1 being output to the amplification unit 13 from the first detection unit 6.

Furthermore, the first detection unit 6 and the second detection unit 7 detect disturbance vibration as well as leak vibration. Disturbance vibration is generated from automobiles and trains traveling on the above-ground, footsteps and voices of people, and compressor sounds of vending machines. Since it is rare that a sensor installed to the pipe 2 detects disturbance vibration including only a Z direction component as described above, vibration in other direction (e.g., the Y direction) is simultaneously detected when vibration in the Z direction component is detected in the sensor, even the disturbance vibration be caused by any disturbance factor. In other words, when disturbance vibration is detected by the first detection unit 6, the disturbance vibration is also simultaneously detected by the second detection unit 7.

The amplification unit 13 and the amplification unit 12 respectively amplify the first signal S1 and the second signal S2 being output from the first detection unit 6 and the second detection unit 7 to input to the calculation unit 11.

The first signal S1 and the second signal S2 are both signals representing time responses of signal levels corresponding to magnitudes of vibration detected by the first detection unit 6 and the second detection unit 7.

The calculation unit 11 transforms input time response signals (the first signal S1 and the second signal S2) to frequency response signals (the third signal F1 and the fourth signal F2). Then, the signal LS is generated according to LS=F1−F2, LS=K1×F1−K2×F2, or LS=C1×F1−C2×F2 described above. As a result, the signal LS in which a leak vibration component is included and a disturbance vibration component is reduced is obtained.

Then, the calculation unit 11 performs at least one of processing, a process of determining a presence or absence of a leak of the fluid 5 from the pipe 2 and a process of specifying a leak position (the leak hole 3) using the signal LS.

As described above, the leak detection device according to the present exemplary embodiment includes the first detection unit 6, the second detection unit 7, and the signal processing unit 10.

The first detection unit 6 is installed to the pipe 2, in which the fluid 5 flows, detects vibration in the first direction, and outputs the first signal S1 representing a magnitude of vibration in the first direction. The second detection unit 7 is installed to the pipe 2, detects vibration in the second direction different from the first direction and outputs the second signal S2 representing a magnitude of vibration in the second direction. The signal processing unit 10 performs an arithmetic operation processing using the first signal S1 and the second signal S2.

According to such a leak detection device of the present exemplary embodiment, signals with different contents corresponding to detection directions (the first direction and the second direction) are obtained. By processing such characteristic signals, it is possible to obtain a signal in which a leak vibration component is included and in which a disturbance vibration component is reduced.

For example, it is possible to cause the first detection device 6 to detect leak vibration by setting the first direction of detection of the first detection unit 6 to the longitudinal direction of the pipe 2. On the other hand, it is possible to cause the second detection unit 7 to hardly detect leak vibration by setting the second direction of detection of the second detection unit 7 to a direction perpendicular to the first direction. As described above, such a first detection unit 6 and a second detection unit 7 both detect disturbance vibration and, when the first detection unit 6 detects disturbance vibration, the second detection unit 7 also simultaneously detects the disturbance vibration.

In such a case, using the third signal F1 representing each frequency of a magnitude of vibration in the first direction calculated using the first signal S1 and the fourth signal F2 representing each frequency of a magnitude of vibration in the second direction calculated using the second signal S2, a difference obtained by subtracting each frequency of the magnitude of the vibration in the second direction in the fourth signal F2 from the magnitude of the vibration in the first direction in the third signal F1 is calculated. Thereby, a signal is obtained in which a leak vibration component remains and from which a disturbance vibration component is removed.

Note that a process as described above may be performed with reducing a signal level of disturbance vibration and emphasizing a signal level of leak vibration, by causing the calculation unit 11 to perform a process as described above using appropriate K1 and K2 or C1 and C2. As a result, it is possible to obtain a signal from which a disturbance vibration component is removed more accurately and in which a leak vibration component is emphasized more accurately.

In the exemplary embodiment described above, although a case, that the fluid 5 flowing in the pipe 2 is water, has been described as an example, the fluid 5 may be other liquid or gas. In addition, although a case that the pipe 2 is installed in the underground has been described as an example, the leak detection device, according to the present exemplary embodiment, may be used as well when the pipe 2 is installed in an attic or a basement of a building and is buried in a wall or a pillar.

Furthermore, as another modified example, the second detection unit 7 may detect vibration in two different directions (two directions perpendicular to the first direction, two directions perpendicular to the longitudinal direction of the pipe 2). For example, the first detection unit 6 may detect vibration in the longitudinal direction (the Z direction as illustrated) of the pipe 2 illustrated in FIG. 2 and the second detection unit 7 may detect vibration in a direction (the Y direction as illustrated) connecting the pipe 2 and the above-ground in the shortest path and in a direction (the X direction as illustrated) tilted by 90° from the direction connecting the pipe 2 and the above-ground in the shortest path, the directions being directions (radial directions of the pipe 2) perpendicular to the longitudinal direction (the Z direction as illustrated) of the pipe 2.

The calculation unit 11 may generate the signal LS using the third signal F1 obtained from the first signal S1 detected by the first detection unit 6, a fourth signal F2Y obtained from a second signal S2Y of the Y direction detected by the second detection unit 7, and a fourth signal F2X obtained from a second signal S2X of the X direction detected by the second detection unit 7.

The second signal S2X is a signal representing a time response of a signal level corresponding to a magnitude of vibration in the X direction detected by the second detection unit 7. The second signal S2Y is a signal representing a time response of a signal level corresponding to a magnitude of vibration in the Y direction detected by the second detection unit 7. The fourth signal F2X is a signal representing each frequency of the magnitude of the vibration in the X direction detected by the second detection unit 7. The fourth signal F2Y is a signal representing each frequency of the magnitude of the vibration in the Y direction detected by the second detection unit 7.

For example, the signal LS may be generated using LS=F1−F2X−F2Y, LS=K1×F1−K2X×F2X−K2Y×F2Y, LS=C1×F1−C2X×F2X−C2Y×F2Y, LS=(F1−F2X)+(F1−F2Y), LS=(K1×F1−K2X×F2X)+(K1×F1−K2Y×F2Y), or LS=(C1×F1−C2X×F2X)+(C1×F1−C2Y×F2Y).

K1, K2X, and K2Y are respectively amplification factors which are predetermined constants. Respective C1, C2X, and C2Y are amplification factors which are variables to be determined for each frequency.

According to such a modified example, even when both of disturbance vibration including only vibration components of the Z direction and the X direction and disturbance vibration including only vibration components of the Z direction and the Y direction illustrated in FIG. 2 are detected by the first detection unit 6, the signal LS from which the both of the disturbance vibration are removed may be generated.

Second Exemplary Embodiment

Figure 8:
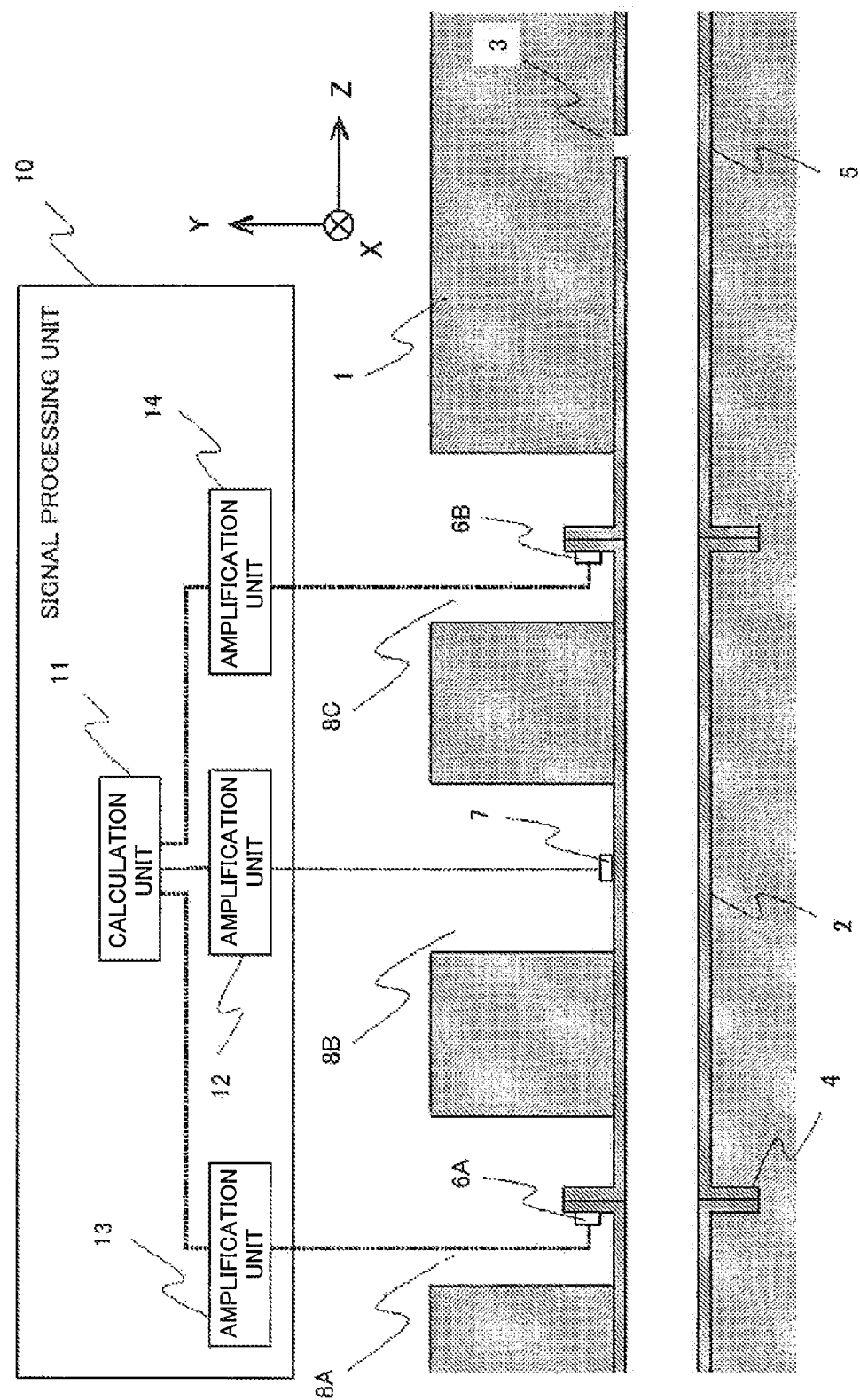
FIG. 8 is one of application examples of the leak detection device of the present exemplary embodiment.

FIG. 8 illustrates an application example of a leak detection device according to a second exemplary embodiment.

The leak detection device of the present exemplary embodiment includes a plurality of first detection units 6. The plurality of the first detection units 6 are installed along a longitudinal direction of a pipe 2 at predetermined intervals.

A second detection unit 7 of the present exemplary embodiment is installed between a first first detection unit 6A and a second first detection unit 6B among the plurality of the first detection units 6.

Configurations of the first detection units 6 (6A, 6B), the second detection unit 7, and the amplification units 12, 13, and 14 are similar to those of the first exemplary embodiment.

A calculation unit 11 of the present exemplary embodiment performs an arithmetic operation processing using a first signal S1 output by the first first detection unit 6A and a second signal S2 output by the second detection unit 7 and also performs an arithmetic operation processing using a first signal S1 output by the second first detection unit 6B and the second signal S2 output by the second detection unit 7.

In other words, the second signal S2 detected by the second detection unit 7 sandwiched by the first first detection unit 6A and the second first detection unit 6B is used in order to remove a disturbance vibration component from the first signal S1 detected by the first first detection unit 6A and is also used in order to remove a disturbance vibration component from the first signal S1 detected by the second first detection unit 6B.

Since other configuration of the calculation unit 11 is similar to that of the first exemplary embodiment, the explanation thereof is omitted.

According to the present exemplary embodiment, a number of the second detection units 7 may be reduced compared with the first exemplary embodiment. As a result, effects such as cost reduction may be realized.

Example

Figure 9:
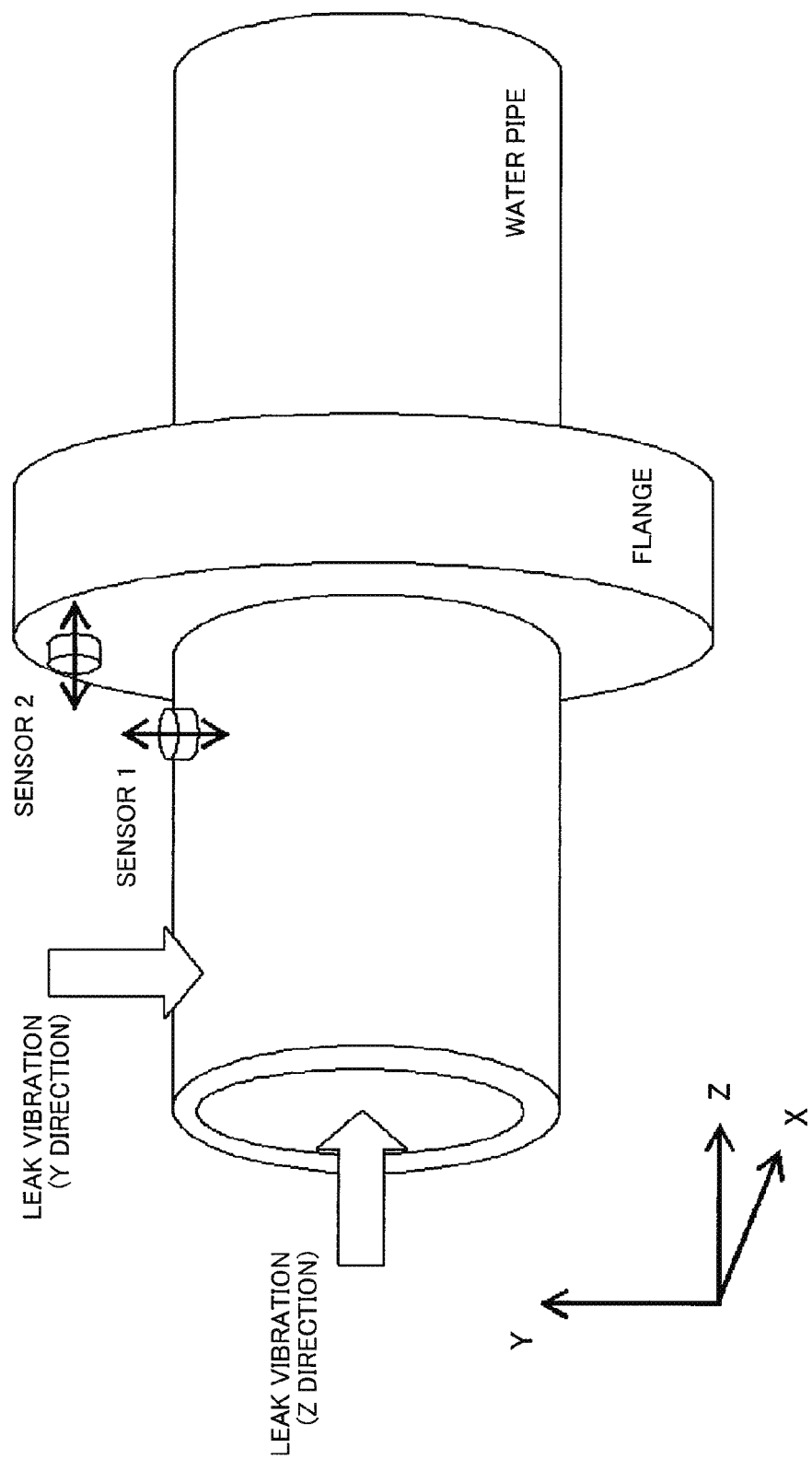
FIG. 9 is a diagram of explaining an Example.

As illustrated in FIG. 9, a sensor 1 was installed to an outer wall surface of a water pipe, and a sensor 2 was installed to a flange. The sensor 1 detects vibration in one direction (Y direction as illustrated) among radial directions of the water pipe. The sensor 2 detects vibration in a longitudinal direction (Z direction as illustrated) of the water pipe.

Data of vibration detected by the sensor 1 and the sensor 2 is illustrated in FIG. 10(*a*) when pressure in the Z direction was applied to the water pipe. The pressure in the Z direction simulates leak vibration traveling to the Z direction.

It can be seen from FIG. 10(*a*) that the vibration is detected in the sensor 2 but is hardly detected in the sensor 1.

Next, data of vibration detected by the sensor 1 and the sensor 2 is illustrated in FIG. 10(*b*) when pressure in the Y direction was applied to the water pipe. The pressure in the Y direction simulates disturbance vibration.

It can be seen from FIG. 10(*b*) that the vibration is detected in the sensor 1 and the sensor 2. Furthermore, it can be seen that peaks presenting in a signal detected by the sensor 2 are also presenting in a signal detected by the sensor 1.

From the above, it can be seen that, by subtracting data of vibration detected by the sensor 1 from data of vibration detected by the sensor 2, when pressure including Z direction pressure and Y direction pressure was applied to a water pipe, data may be obtained in which a peak of vibration in the Z direction remains and from which a peak of vibration in the Y direction is removed.

<Supplemental Note>

According to the above description, the following description of the invention has been made.

<Invention 1>

A leak detection device including: a first detection unit for detecting vibration in a first direction and outputting a first signal S1 representing a magnitude of the vibration in the first direction, the first detection unit being installed to a pipe in which fluid flows; a second detection unit for detecting vibration in a second direction different from the first direction and outputting a second signal S2 representing a magnitude of the vibration in the second direction, the second detection unit being installed to the pipe; and a signal processing unit for performing an arithmetic operation processing using the first signal S1 and the second signal S2.

<Invention 2>

The leak detection device according to the invention 1, wherein the first direction is a longitudinal direction of the pipe, and the second direction is a direction perpendicular to the first direction.

<Invention 3>

The leak detection device according to the invention 1 or 2, wherein, using a third signal F1 representing each frequency of a magnitude of vibration in the first direction calculated using the first signal S1 and a fourth signal F2 representing each frequency of a magnitude of vibration in the second direction calculated using the second signal S2, the signal processing unit generates, according to LS=F1−F2, a signal LS representing each frequency of a difference obtained by subtracting for each frequency the magnitude of the vibration in the second direction in the fourth signal F2 from the magnitude of the vibration in the first direction in the third signal F1 and performs, using the signal LS, at least one of processing, a process of determining a presence or absence of a leak of fluid from the pipe and a process of identifying a leak position.

<Invention 4>

The leak detection device according to the invention 1 or 2, wherein, using K1×F1 which is a signal obtained by correcting a magnitude of vibration in the first direction in a third signal F1 using the third signal F1 representing each frequency of the magnitude of the vibration in the first direction calculated using the first signal S1 and a first amplification factor K1 which is a predetermined constant and K2×F2 which is a signal obtained by correcting a magnitude of vibration in the second direction in a fourth signal F2 using the fourth signal F2 representing each frequency of the magnitude of the vibration in the second direction calculated using the second signal S2 and a second amplification factor K2 which is a predetermined constant, the signal processing unit generates, according to LS=K1×F1−K2×F2, a signal LS representing for each frequency a difference obtained by subtracting each frequency of a magnitude of vibration of K2×F2 from a magnitude of vibration of K1×F1 and performs, using the signal LS, at least one of processing, a process of determining a presence or absence of a leak of fluid from the pipe and a process of identifying a leak position.

<Invention 5>

The leak detection device according to the invention 1 or 2, wherein, using C1×F1 which is a signal obtained by correcting each frequency of a magnitude of vibration in the first direction in a third signal F1 using the third signal F1 representing each frequency of the magnitude of the vibration in the first direction calculated using the first signal S1 and a first amplification factor C1 which is a variable to be determined by each frequency and C2×F2 which is a signal obtained by correcting each frequency of a magnitude of vibration in the second direction in a fourth signal F2 using the fourth signal F2 representing each frequency of the magnitude of the vibration in the second direction calculated using the second signal S2 and a second amplification factor C2 which is a variable to be determined by each frequency, the signal processing unit generates, according to LS=C1×F1−C2×F2, a signal LS representing each frequency of a difference obtained by subtracting each frequency of a magnitude of vibration of C2×F2 from a magnitude of vibration of C1×F1 and performs at least one of processing, a process of determining a presence or absence of a leak of fluid from the pipe and a process of identifying a leak position using the signal LS.

<Invention 6>

The leak detection device according to any one of the inventions 1 to 5, wherein the first and second detection units are installed to the pipe directly or via a mechanism through which vibration propagates.

<Invention 7>

The leak detection device according to the invention 6, wherein a plurality of the first detection units are installed to the pipe along a longitudinal direction thereof, the second detection unit is installed between a first first detection unit and a second first detection unit among the plurality of the first detection units, and the signal processing unit performs an arithmetic operation processing using the first signal S1 output by the first first detection unit and the second signal S2 output by the second detection unit and also performs an arithmetic operation processing using a first signal S1 output by the second first detection unit and the second signal S2.

<Invention 8>

The leak detection device according to any one of the inventions 1 to 6, the leak detection device including a sensor capable of separately detecting vibration in at least two axial directions, wherein the first detection unit and the second detection unit are configured of the sensor.

<Invention 9>

A leak detection method for causing a computer to execute: a first detection step of detecting vibration in a first direction by controlling a sensor installed to a pipe in which fluid flows and outputting a first signal S1 representing a magnitude of the vibration in the first direction; a second detection step of detecting vibration in a second direction different from the first direction by controlling a sensor installed to the pipe and outputting a second signal S2 representing a magnitude of the vibration in the second direction; and a signal processing step of performing an arithmetic operation processing using the first signal S1 and the second signal S2.

<Invention 9-2>

The leak detection method according to the invention 9, wherein the first direction is a longitudinal direction of the pipe and the second direction is a direction perpendicular to the first direction.

<Invention 9-3>

The leak detection method according to the invention 9 or 9-2, wherein, in the signal processing step, using a third signal F1 representing each frequency of a magnitude of vibration in the first direction calculated using the first signal S1 and a fourth signal F2 representing each frequency of a magnitude of vibration in the second direction calculated using the second signal S2, the signal processing unit generates, according to LS=F1-F2, a signal LS representing each frequency of a difference obtained by subtracting each frequency of the magnitude of the vibration in the second direction in the fourth signal F2 from the magnitude of the vibration in the first direction in the third signal F1 and performs, using the signal LS, at least one of processing, a process of determining a presence or absence of a leak of fluid from the pipe and a process of identifying a leak position.

<Invention 9-4>

The leak detection method according to the invention 9 or 9-2, wherein, in the signal processing step, using K1×F1 which is a signal obtained by correcting a magnitude of vibration in the first direction in a third signal F1 using the third signal F1 representing each frequency of the magnitude of the vibration in the first direction calculated using the first signal S1 and a first amplification factor K1 which is a predetermined constant and K2×F2 which is a signal obtained by correcting a magnitude of vibration in the second direction in a fourth signal F2 using the fourth signal F2 representing each frequency the magnitude of the vibration in the second direction calculated using the second signal S2 and a second amplification factor K2 which is a predetermined constant, the signal processing unit generates, according to LS=K1×F1−K2×F2, a signal LS representing for each frequency a difference obtained by subtracting each frequency of a magnitude of vibration of K2×F2 from a magnitude of vibration of K1×F1 and performs, using the signal LS, at least one of processing, a process of determining a presence or absence of a leak of fluid from the pipe and a process of identifying a leak position.

<Invention 9-5>

The leak detection method according to the invention 9 or 9-2, wherein, in the signal processing step, using C1×F1 which is a signal obtained by correcting each frequency of a magnitude of vibration in the first direction in a third signal F1 using the third signal F1 representing each frequency of the magnitude of the vibration in the first direction calculated using the first signal S1 and a first amplification factor C1 which is a variable to be determined by each frequency and C2×F2 which is a signal obtained by correcting each frequency of a magnitude of vibration in the second direction in a fourth signal F2 using the fourth signal F2 representing each frequency of the magnitude of the vibration in the second direction calculated using the second signal S2 and a second amplification factor C2 which is a variable to be determined by each frequency, the signal processing unit generates, according to LS=C1×F1−C2×F2, a signal LS representing each frequency of a difference obtained by subtracting each frequency of a magnitude of the vibration of C2×F2 from a magnitude of the vibration of C1×F1 and performs at least one of processing, a process of determining a presence or absence of a leak of fluid from the pipe and a process of specifying a leak position using the signal LS.

<Invention 9-6>

The leak detection method according to any one of the inventions 9 to 9-5, wherein a first detection unit for detecting vibration in the first detection step and a second detection unit for detecting vibration in the second detection step are installed to the pipe directly or via a mechanism through which vibration propagates.

<Invention 9-7>

The leak detection method according to the invention 9-6, wherein a plurality of the first detection units are installed to the pipe along a longitudinal direction thereof, the second detection unit is installed between a first first detection unit and a second first detection unit among the plurality of the first detection units, and, in the signal processing step, an arithmetic operation processing is performed using the first signal S1 output by the first first detection unit and the second signal S2 output by the second detection unit, and an arithmetic operation processing is also performed using the first signal S1 output by the second first detection unit and the second signal S2.

<Invention 9-8>

The leak detection method according to any one of the inventions 9 to 9-6, wherein vibration detection in the first detection step and the second detection step is performed using the sensor capable of separately detecting vibration in at least two axial directions.

<Invention 10>

A program for causing a computer to function as: a first detection means for detecting vibration in a first direction by controlling a sensor installed to a pipe in which fluid flows and outputting a first signal S1 representing a magnitude of the vibration in the first direction; a second detection means for detecting vibration in a second direction different from the first direction by controlling a sensor installed to the pipe and outputting a second signal S2 representing a magnitude of the vibration in the second direction; and a signal processing means of performing an arithmetic operation processing using the first signal S1 and the second signal S2.

<Invention 10-2>

The program according to the invention 10, wherein the first direction is a longitudinal direction of the pipe, and the second direction is a direction perpendicular to the first direction.

<Invention 10-3>

The program according to the invention 10 or 10-2, wherein the program causes the signal processing means to generate, using a third signal F1 representing each frequency of a magnitude of vibration in the first direction calculated using the first signal S1 and a fourth signal F2 representing each frequency of a magnitude of vibration in the second direction calculated using the second signal S2, a signal LS representing each frequency of a difference obtained by subtracting each frequency of the magnitude of the vibration in the second direction in the fourth signal F2 from the magnitude of the vibration in the first direction in the third signal F1 according to LS=F1−F2 and to perform, using the signal LS, at least one of processing, a process of determining a presence or absence of a leak of fluid from the pipe and a process of identifying a leak position.

<Invention 10-4>

The program according to the invention 10 or 10-2, wherein the program causes the signal processing means to generate, using K1×F1 which is a signal obtained by correcting a magnitude of vibration in the first direction in a third signal F1 using the third signal F1 representing each frequency of the magnitude of the vibration in the first direction calculated using the first signal S1 and a first amplification factor K1 which is a predetermined constant and K2×F2 which is a signal obtained by correcting a magnitude of vibration in the second direction in a fourth signal F2 using the fourth signal F2 representing each frequency of the magnitude of the vibration in the second direction calculated using the second signal S2 and a second amplification factor K2 which is a predetermined constant, a signal LS representing each frequency of a difference obtained by subtracting a magnitude of vibration of K2×F2 from a magnitude of vibration of K1×F1 according to LS=K1×F1−K2×F2 and to perform, using the signal LS, at least one of processing, a process of determining a presence or absence of a leak of fluid from the pipe and a process of identifying a leak position.

<Invention 10-5>

The program according to the invention 10 or 10-2, wherein the program causes the signal processing means to generate, using C1×F1 which is a signal obtained by correcting each frequency of a magnitude of vibration in the first direction in a third signal F1 using the third signal F1 representing each frequency of the magnitude of the vibration in the first direction calculated using the first signal S1 and a first amplification factor C1 which is a variable to be determined by each frequency and C2×F2 which is a signal obtained by correcting each frequency of a magnitude of vibration in the second direction in a fourth signal F2 using the fourth signal F2 representing each frequency of the magnitude of the vibration in the second direction calculated using the second signal S2 and a second amplification factor C2 which is a variable to be determined by each frequency, a signal LS representing each frequency of a difference obtained by subtracting a magnitude of vibration of C2×F2 from a magnitude of vibration of C1×F1 according to LS=C1×F1−C2×F2 and to perform, using the signal LS, at least one of processing, a process of determining a presence or absence of a leak of fluid from the pipe and a process of identifying a leak position.

<Invention 10-6>

The program according to any one of the inventions 10 to 10-5, wherein a first sensor with which the first detection means detects vibration and a second sensor with which the second detection means detects vibration are installed to the pipe directly or via a mechanism through which vibration propagates.

<Invention 10-7>

The program according to the invention 10-6, wherein a plurality of the first sensors are installed to the pipe along a longitudinal direction thereof, the second sensor is installed between a first first sensor and a second first sensor among the plurality of the first sensors, and the program causes the signal processing means to perform an arithmetic operation processing using the first signal S1 detected by the first first sensor and the second signal S2 detected by the second sensor and also to perform an arithmetic operation processing using the first signal S1 detected by the second first sensor and the second signal S2.

<Invention 10-8>

The program according to any one of the inventions 10 to 10-6, wherein the first detection means and the second detection means detect vibration via a sensor capable of separately detecting vibration in at least two axial directions.

This application claims priority based on Japanese Patent Application No. 2012-216948, filed on Sep. 28, 2012, the entire disclosure of which is incorporated herein.

The invention claimed is:

1. A leak detection device comprising:
a processor configured to perform an arithmetic operation by:
 processing a first signal output from a first detection unit installed to a pipe through which fluid flows, the first signal representing a magnitude of vibration in a first axial direction,
 processing a second signal output from a second detection unit installed to the pipe, the second signal representing a magnitude of vibration in a second axial direction, wherein the second axial direction is different than the first axial direction,
 calculating a third signal (F1) that represents a frequency of the magnitude of vibration in the first axial direction calculated using the first signal;
 calculating a fourth signal (F2) that represents a frequency of the magnitude of vibration in the second axial direction calculated using the second signal;
 generating a signal (LS), that represents a difference obtained by subtracting the fourth signal (F2) from the third signal (F1); and
 determining, using the signal LS, at least one of a presence or absence of a leak of fluid from the pipe, and a leak position.

2. The leak detection device according to claim 1, wherein the first axial direction is a longitudinal direction of the pipe and the second axial direction is a direction perpendicular to the first axial direction.

3. The leak detection device according to claim 1, wherein the processor is configured to perform the arithmetic operation by:
 calculating $K1 \times F1$, where K1 is a first amplification factor configured as a predetermined constant;
 calculating $K2 \times F2$, where K2 is a second amplification factor configured as a second predetermined constant; and
 wherein generating the signal LS of the difference is according to $LS=(K1 \times F1)-(K2 \times F2)$.

4. The leak detection device according to claim 1, wherein the processor is further configured to perform the arithmetic operation by:
 calculating $C1 \times F1$, where C1 is a first amplification factor which is a variable based on the frequency of the magnitude of vibration in the first axial direction;
 calculating $C2 \times F2$, where C2 is a second amplification factor which is a variable determined based on the frequency of the magnitude of vibration in the second axial direction;
 wherein generating the signal LS is according to $LS=(C1 \times F1)-(C2 \times F2)$.

5. The leak detection device according to claim 1, wherein the first and second detection units are installed to the pipe directly or via a mechanism through which vibration propagates.

6. The leak detection device according to claim 5, wherein the first detection unit comprises a plurality of first detection units installed to the pipe along a longitudinal direction thereof, the second detection unit is installed between a first detection unit of the plurality of first detection units and a second detection unit of the plurality of first detection units, and wherein the processor is further configured to perform the arithmetic operation using the second signal and the first signal output by the second detection unit of the plurality of first detection units.

7. The leak detection device according to claim 1, wherein first detection unit and the second detection unit form a single sensor.

8. A leak detection method comprising:
 receiving, using a processor, from a first sensor installed to a pipe, a first signal representing a magnitude of vibration in a first axial direction;
 receiving, using the processor, from a second sensor installed to the pipe, a second signal representing a magnitude of vibration in a second axial direction, wherein the second axial direction is different than the first axial direction;
 calculating a third signal (F1) that represents a frequency of the magnitude of vibration in the first axial direction calculated using the first signal;
 calculating a fourth signal (F2) that represents a frequency of the magnitude of vibration in the second axial direction calculated using the second signal;
 generating a signal (LS), that represents a difference obtained by subtracting the fourth signal (F2) from the third signal (F1); and
 determining, using the signal LS, at least one of a presence or absence of a leak of fluid from the pipe, and a leak position.

9. A tangible, non-transitory machine-readable medium comprising stored executable instructions that, when executed by a processor, cause the processor to perform a method comprising:
 receiving, from a first sensor installed to a pipe through which fluid flows, a first signal representing a magnitude of vibration in a first axial direction;
 receiving, from a second sensor installed to the pipe, a second signal representing a magnitude of vibration in a second axial direction different than the first axial direction;
 calculating a third signal (F1) that represents a frequency of the magnitude of vibration in the first axial direction calculated using the first signal;
 calculating a fourth signal (F2) that represents a frequency of the magnitude of vibration in the second axial direction calculated using the second signal;
 generating a signal (LS), that represents a difference obtained by subtracting the fourth signal (F2) from the third signal (F1); and
 determining, using the signal LS, at least one of a presence or absence of a leak of fluid from the pipe, and a leak position.

10. The leak detection device according to claim 1, wherein an angle formed between the first axial direction and the second axial direction is 90 degrees.

11. The leak detection method according to claim 8, wherein an angle formed between the first axial direction and the second axial direction is 90 degrees.

12. The leak detection method according to claim 8, comprising:
- calculating K1×F1, where K1 is a first amplification factor configured as a predetermined constant;
- calculating K2×F2, where K2 is a second amplification factor configured as a predetermined constant;
- wherein generating the signal LS is according to LS=(K1×F1)−(K2×F2).

13. The computer-readable medium according to claim 9, wherein the first sensor detects vibration in the first axial direction and the second sensor detects vibration in the second axial direction.

14. The computer-readable medium according to claim 9, wherein an angle formed between the first axial direction and the second axial direction is 90 degrees.

15. The computer-readable medium according to claim 9, wherein the method comprises:
- calculating K1×F1, where K1 is a first amplification factor configured as a predetermined constant;
- calculating K2×F2, where K2 is a second amplification factor configured as a predetermined constant;
- wherein generating the signal LS is according to LS=(K1×F1)−(K2×F2).

* * * * *